US012626876B2

(12) United States Patent
Ogawa et al.

(10) Patent No.: US 12,626,876 B2
(45) Date of Patent: May 12, 2026

(54) ELECTROMAGNETIC RELAY HAVING A CASE ANS A YOKE FIXED OUTSIDE A WALL OF THE CASE

(71) Applicant: OMRON Corporation, Kyoto (JP)

(72) Inventors: Shinichi Ogawa, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 216 days.

(21) Appl. No.: 18/218,588

(22) Filed: Jul. 6, 2023

(65) Prior Publication Data

US 2024/0029982 A1 Jan. 25, 2024

(30) Foreign Application Priority Data

Jul. 22, 2022 (JP) ................................ 2022-117464

(51) Int. Cl.
*H01H 50/04* (2006.01)
*H01H 50/54* (2006.01)
*H01H 50/60* (2006.01)

(52) U.S. Cl.
CPC ......... *H01H 50/047* (2013.01); *H01H 50/546* (2013.01); *H01H 50/60* (2013.01)

(58) Field of Classification Search
None
See application file for complete search history.

(56) References Cited

U.S. PATENT DOCUMENTS 8,138,863 B2 * 3/2012 Tanaka .................. H01H 50/38 335/131
10,483,064 B2 * 11/2019 Kobayashi ............ H01H 50/36
2011/0032059 A1 * 2/2011 Ito .......................... H01H 50/14 218/25
2015/0022291 A1 1/2015 Kashimura et al.
2015/0213984 A1 * 7/2015 Naka .................... H01H 50/546 335/196
2023/0005691 A1 1/2023 Otsuka et al.
2024/0395487 A1 * 11/2024 Ogawa .................. H01H 50/54

FOREIGN PATENT DOCUMENTS

JP H11-260232 A 9/1999
JP 2013-222562 A 10/2013
JP 2019-128971 A 8/2019
JP 2021-97002 A 6/2021
KR 10-2010-0126530 A 12/2010

OTHER PUBLICATIONS

The Office Action for the corresponding Korean application No. 10-2023-0077231 issued on Jul. 3, 2025.
The Office Action for the corresponding Japanese application No. 2022-117464 issued on Jan. 20, 2026.
The Office Action of the corresponding Korean application No. 10-2023-0077231 issued on Nov. 15, 2024.

* cited by examiner

*Primary Examiner* — Bernard Rojas
(74) *Attorney, Agent, or Firm* — SHINJYU GLOBAL IP

(57) ABSTRACT

An electromagnetic relay includes a case, a contact device, and an electromagnet device. The contact device includes a fixed contact and a movable contact piece including a movable contact. The electromagnet device is configured to drive the contact device. The electromagnet device is housed in the case. The electromagnet device includes a yoke. The yoke includes an extending portion extending to outside the case. The yoke is secured to the case via the extending portion.

6 Claims, 3 Drawing Sheets

ELECTROMAGNETIC RELAY HAVING A CASE ANS A YOKE FIXED OUTSIDE A WALL OF THE CASE

CROSS-REFERENCE TO RELATED APPLICATION

This application claims priority to Japanese Patent Application No. 2022-117464, filed Jul. 22, 2022. The contents of that application are incorporated by reference herein in their entirety.

FIELD

The claimed invention relates to electromagnetic relays.

BACKGROUND

Conventionally, an electromagnetic relay including a case and an electromagnet device housed in the case is known, such as the one disclosed in Japanese Patent Application Laid-Open No. 2013-222562. The electromagnet device includes a yoke. The yoke of the electromagnet device is secured to the case by urethane filling.

SUMMARY

Such security of the yoke to the case by urethane requires control of its manufacturing process, increasing the manufacturing cost.

An object of the present invention is to reduce the manufacturing cost of an electromagnetic relay.

An electromagnetic relay according to one aspect of the present invention includes a case, a contact device, and an electromagnet device. The contact device includes a fixed contact and a movable contact piece including a movable contact. The electromagnet device is configured to drive the contact device. The electromagnet device is housed in the case. The electromagnet device includes a yoke. The yoke includes an extending portion extending to outside of the case. The yoke is secured to the case at the extending portion.

In this electromagnetic relay, the yoke is secured to the case at the extending portion of the yoke that extends to outside of the case. That is, since the yoke and the case can be secured together at outside of the case, for example, the yoke and the case can be screwed together at the extending portion. As a result, the manufacturing cost of the electromagnetic relay can be reduced as compared with the case where the yoke is secured to the case by urethane.

The extension may be screwed to the case. In this case, the manufacturing cost of the electromagnetic relay can be reduced, and also the case and the yoke can be easily secured together with a screw member.

The case may include a mounting portion exposed to outside of the case. The mounting portion may have a first screw-receiving hole passing therethrough in a first direction. The extending portion may have a second screw-receiving hole overlapping the first screw-receiving hole when viewed from the first direction. In this case, the manufacturing cost of the electromagnetic relay can be reduced, and also the case and the yoke can be easily secured together with a screw member.

The extending portion may be screwable to an other member together with the mounting portion. In this case, the other member can be screwed to the yoke together with the case.

The case may further include a recess recessed in a direction from the contact device toward the electromagnet device. The extending portion may be disposed in the recess. In this case, the case can be downsized.

The movable contact may face the fixed contact in the first direction. The extending portion may extend to outside of the case from an intermediate position of the case in the first direction. In this case, the position where the yoke and the case are secured together is close to the center of gravity of the electromagnetic relay, enhancing durability against shock.

The electromagnetic relay may further include a contact case that is housed in the case. The contact device may be housed in the contact case. In this case, the yoke and the case can be secured together at outside the case in the electromagnetic relay that has a contact case in the case.

DETAILED DESCRIPTION

Figure 1:
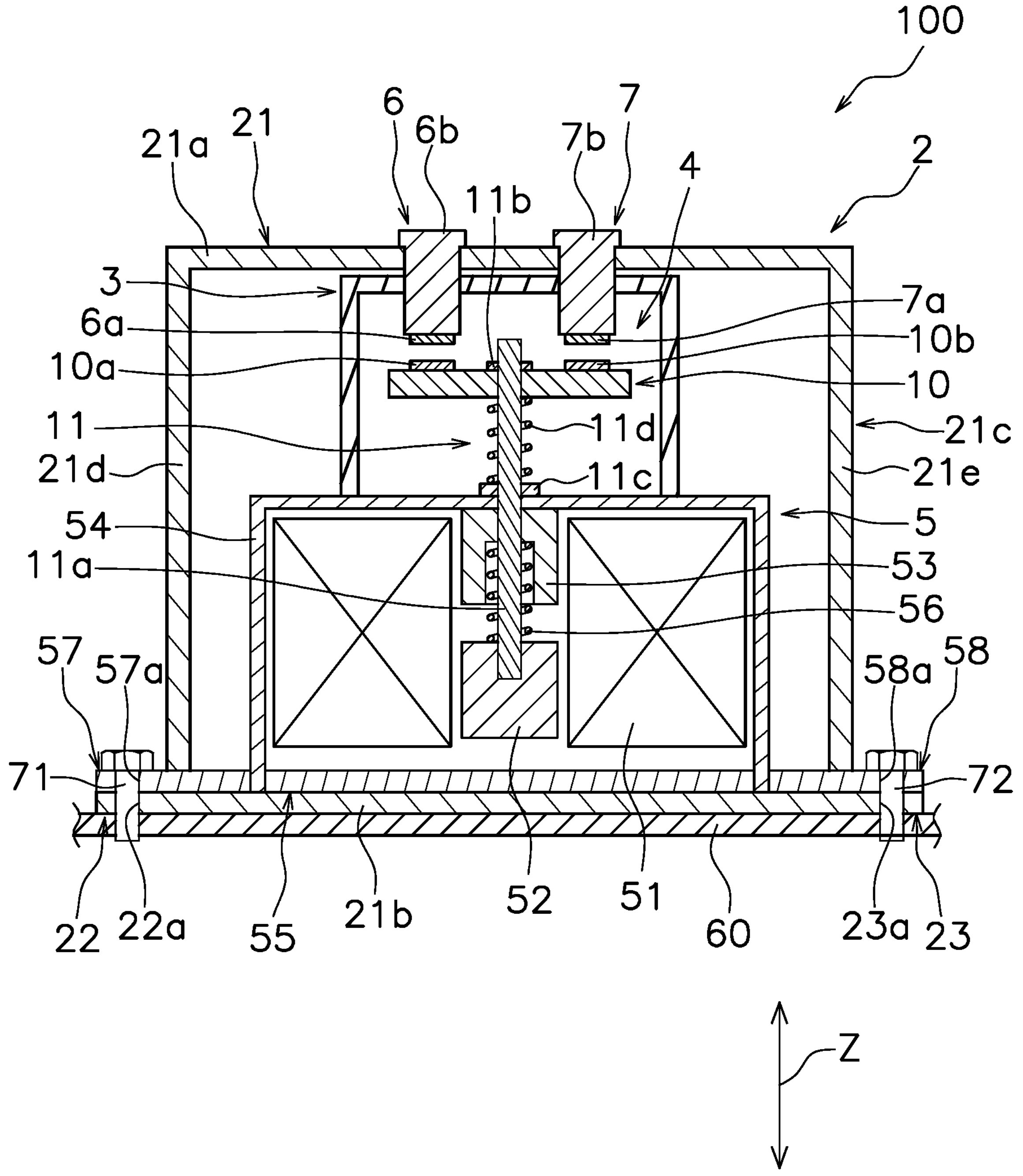
FIG. 1 is a schematic cross-sectional view of an electromagnetic relay in accordance with the claimed invention.

An embodiment of an electromagnetic relay 100 according to one aspect of the claimed invention will be described below with reference to the drawings. When referring to the drawings, the upper side in FIG. 1 is referred to as “up”, the lower side as “down”, the left side as “left”, and the right side as “right” in order to facilitate understanding. Also, the direction orthogonal to the plane of FIG. 1 is defined as the front-rear direction. The up-down direction in the present embodiment is an example of a first direction Z. These directions are defined for convenience of description, and are not to limit the arrangement directions of the electromagnetic relay 100.

FIG. 1 is a schematic cross-sectional view of the electromagnetic relay 100. As shown in FIG. 1, the electromagnetic relay 100 includes a case 2, a contact case 3, a contact device 4, and an electromagnet device 5.

The case 2 has a substantially rectangular box shape and is comprised of an insulating material. In the present embodiment, the case 2 may be comprised of resin. The case 2 accommodates the electromagnet device 5 and the contact case 3. The case 2 includes a case body 21, a lid (not shown), and mounting portions 22 and 23.

The case body 21 is open forward. The case body 21 includes a top wall 21*a*, a bottom wall 21*b*, and side walls 21*c*. The top wall 21*a*, the bottom wall 21*b*, and the side wall 21*c* are the outer walls of the case 2. The top wall 21*a* and the bottom wall 21*b* extend in a direction perpendicular to the up-down direction. The side wall 21*c* is disposed between the top wall 21*a* and the bottom wall 21*b* and are connected to the top wall 21*a* and the bottom wall 21*b*. The side wall 21*c* includes a left wall 21*d*, a right wall 21*e*, and a rear wall (not shown). The lid is disposed to cover the front of the case body 21.

The mounting portions 22 and 23 are exposed to outside of the case 2. The mounting portions 22 and 23 extend to outside of the case 2. The mounting portions 22 and 23 are disposed on the bottom wall 21*b* of the case body 21. The mounting portions 22 and 23 in the present embodiment are portions to be mounted to another member 60, e.g., by being attached to the other member 60 by screws. The other member 60 is a member to which the electromagnetic relay 100 is attached. The other member 60 in the present embodiment is, for example, a substrate.

The mounting portion 22 protrudes leftward from the left wall 21*d* of the case body 21. The mounting portion 22 has a first screw-receiving hole 22*a*. The first screw-receiving hole 22*a* passes through the mounting portion 22 in the up-down direction. The first screw-receiving hole 22*a* is configured to receive a male screw member 71 therethrough. The first screw-receiving hole 22*a* may have a female thread to be screwed with the male screw member 71.

The mounting portion 23 has a similar shape to that of the mounting portion 22. The mounting portion 23 protrudes rightward from the right wall 21*e* of the case body 21. The mounting portion 23 has a first screw-receiving hole 23*a*. The first screw-receiving hole 23*a* passes through the mounting portion 22 in the up-down direction. The first screw-receiving hole 23*a* is configured to receive a male screw member 72 therethrough. The first screw-receiving hole 23*a* may have a female thread to be screwed with the male screw member 72.

The contact case 3 has a substantially rectangular box shape and is comprised of an insulating material. In the present embodiment, the contact case 3 is comprised of resin. The contact case 3 may be comprised of ceramic or metal.

The contact case 3 is housed in the case 2. The contact case 3 is disposed on top of the electromagnet device 5. The contact case 3 is fixed to the electromagnet device 5.

The contact device 4 includes a first fixed terminal 6, a second fixed terminal 7, a movable contact piece 10, and a movable mechanism 11.

The first fixed terminal 6 and the second fixed terminal 7 may each be cylindrical terminal and extend in the up-down direction. The first fixed terminal 6 and the second fixed terminal 7 are spaced apart from each other in the left-right direction. The first fixed terminal 6 and the second fixed terminal 7 may be comprised of a conductive material such as copper.

The first fixed terminal 6 includes a first fixed contact 6*a* and a first external connection 6*b*. The first fixed contact 6*a* is comprised of a conductive material such as copper. The first fixed contact 6*a* is housed in the contact case 3. The first fixed contact 6*a* is disposed on the lower surface of the first fixed terminal 6. The first fixed contact 6*a* may be integrated with the first fixed terminal 6. The first external connection 6*b* protrudes upward from the case 2 and is exposed to outside of the case 2.

The second fixed terminal 7 is disposed apart from the first fixed terminal 6 in the left-right direction. The second fixed terminal 7 is disposed to the right of the first fixed terminal 6. The second fixed terminal 7 includes a second fixed contact 7*a* and a second external connection portion 7*b*. The second fixed contact 7*a* is comprised of a conductive material such as copper. The second fixed contact 7*a* is housed in the contact case 3. The second fixed contact 7*a* is disposed on the lower surface of the second fixed terminal 7. The second fixed contact 7*a* may be integrated with the second fixed terminal 7. The second external connection portion 7*b* protrudes upward from the case 2 and is exposed to outside of the case 2.

The movable contact piece 10 is comprised of a conductive material such as copper. The movable contact piece 10 is housed in the contact case 3. The movable contact piece 10 is disposed below the first fixed contact 6*a* and the second fixed contact 7*a*.

The movable contact piece 10 is disposed to be movable in a direction in which a first movable contact 10*a* comes in contact with the first fixed contact 6*a* (upward in the present embodiment) and in a direction in which a first movable contact 10*a* separates from the first fixed contact 6*a* (downward in the present embodiment). That is, in the present embodiment, the movable contact piece 10 is set to be movable in the up-down direction.

The movable contact piece 10 includes the first movable contact 10*a* and the second movable contact 10*b*. The first movable contact 10*a* faces the first fixed contact 6*a* in the up-down direction. The first movable contact 10*a* is disposed below the first fixed contact 6*a* and is configured to come into contact with the first fixed contact 6*a* as the movable contact piece 10 moves. The second movable contact 10*b* faces the second fixed contact 7*a* in the up-down direction. The second movable contact 10*b* is disposed below the second fixed contact 7*a* and is configured to come into contact with the second fixed contact 7*a* as the movable contact piece 10 moves. The first movable contact 10*a* and the second movable contact 10*b* may be integrated with the movable contact piece 10.

The movable mechanism 11 includes a drive shaft 11*a*, a first holding member 11*b*, a second holding member 11*c*, and a contact spring 11*d*. The drive shaft 11*a* is coupled to the movable contact piece 10. The drive shaft 11*a* extends in the up-down direction and passes through the movable contact piece 10 in the up-down direction. The drive shaft 11*a* is set to be movable in the up-down direction.

The first holding member 11*b* is fixed to the drive shaft 11*a* above the movable contact piece 10. The second holding member 11*c* is fixed to the drive shaft 11*a* below the movable contact piece 10. The contact spring 11*d* is disposed between the movable contact piece 10 and the second holding member 11*c*. The contact spring 11*d* is configured to urge the movable contact piece 10 upward via the second holding member 11*c*.

The electromagnet device 5 is disposed below the contact device 4. The electromagnet device 5 is housed in the case 2. The electromagnet device 5 is supported by the bottom wall 21*b* of the case 2. The electromagnet device 5 uses electromagnetic force to move the movable contact piece 10 in the up-down direction via the drive shaft 11*a* of the movable mechanism 11. The electromagnet device 5 includes a coil 51, a movable iron core 52, a fixed iron core 53, a first yoke 54, a second yoke 55 and a return spring 56.

Upon application of a voltage for excitation, the coil 51 generates an electromagnetic force to move the movable iron core 52 upward. The movable iron core 52 is coupled to the drive shaft 11*a* so as to be movable integrally therewith. The fixed iron core 53 is disposed opposed to the movable iron core 52. The fixed iron core 53 is positioned above the movable iron core 52. The drive shaft 11*a* passes through the fixed iron core 53 in the up-down direction.

The first yoke 54 is disposed between the contact case 3 and the coil 51. The first yoke 54 has a U shape when viewed from the front-rear direction. The first yoke 54 is disposed above the coil 51 and on the left and right sides of the coil 51. The first yoke 54 is fixed to the contact case 3. The first yoke 54 is connected to the fixed iron core 53. The first yoke 54 is, at its lower end, connected to the second yoke 55. The first yoke 54 is fixed to the second yoke 55.

The second yoke 55 extends in a direction orthogonal to the up-down direction and has a rectangular shape when viewed from above. The second yoke 55 in the present embodiment is an example of a yoke. The second yoke 55 is disposed above the bottom wall 21*b* of the case body 21. The second yoke 55 extends between the inside and the outside of case 2.

The second yoke 55 includes extending portions 57 and 58. The extending portions 57 and 58 extend to outside of the case 2. The extending portions 57 and 58 are exposed to outside of the case 2. The second yoke 55 is secured to the case 2 at the extending portions 57 and 58. The extending portions 57 and 58 are configured to be attached to the case 2 via screws. The extending portions 57 and 58 in the present embodiment are screw-mountable to the other member 60 together with the mounting portions 22 and 23.

The extending portion 57 protrudes leftward from the left wall 21*d* of the case body 21. The extending portion 57 is disposed on top of the mounting portion 22 of the case 2. The extending portion 57 overlaps the mounting portion 22 when viewed in the up-down direction. The extending portion 57 is secured to the mounting portion 22. The extending portion 57 is screwed to the mounting portion 22 by the male screw member 71. The extending portion 57 has a second screw-receiving hole 57*a*. The second screw-receiving hole 57*a* is configured to receive the male screw member 71 therethrough. The second screw-receiving hole 57*a* overlaps with the first screw-receiving hole 22*a* when viewed in the up-down direction.

The extending portion 58 has a similar shape to that of the extending portion 57. The extending portion 57 protrudes rightward from the right wall 21*e* of the case body 21. The extending portion 58 is disposed on top of the mounting portion 23 of the case 2. The extending portion 58 overlaps the mounting portion 23 when viewed in the up-down direction. The extending portion 58 is secured to the mounting portion 23. The extending portion 58 is screw-attached to the mounting portion 23 by the male screw member 72. The extending portion 58 has a second screw-receiving hole 58*a*. The second screw-receiving hole 58*a* is configured to receive the male screw member 72 therethrough. The second screw-receiving hole 58*a* overlaps the first screw-receiving hole 23*a* when viewed in the up-down direction.

The return spring 56 is disposed between the movable iron core 52 and the fixed iron core 53, and urges the movable iron core 52 away from the fixed iron core 53 (downward in the present embodiment).

The contact device 4 and the electromagnet device 5 are operated conventionally, and thereby the description of operation is omitted.

In the electromagnetic relay 100 configured as described above, the second yoke 55 is secured to the case 2 at the extending portions 57 and 58 of the second yoke 55 extending to the outside of the case 2. That is, the second yoke 55 and the case 2 can be secured together at positions outside of the case 2. Specifically, the second yoke 55 and the case 2 can be joined together by screws at the extending portions 57 and 58. As a result, compared to the case where the second yoke 55 is secured to the case 2 using urethane, the manufacturing cost of the electromagnetic relay 100 can be reduced. In addition, the other member 60 can be attached to the second yoke 55 via screws together with the case 2.

One embodiment of the electromagnetic relay according to one aspect of the present invention has been described above. The present invention is, however, not limited to the above embodiment, and various modifications are possible without departing from the scope of the invention.

The configurations of the first fixed terminal 6 and the second fixed terminal 7 may be changed. The first fixed terminal 6 and the second fixed terminal 7 may have a C-shaped shape. Alternatively, the first fixed terminal 6 and the second fixed terminal 7 may be plate-shaped terminals. For example, the first fixed terminal 6 may protrude leftward from the left wall 21*d* of the case 2, and the second fixed terminal 7 may protrude rightward from the right wall 21*e* of the case 2.

The configurations of the contact device 4 and the electromagnet device 5 may be changed. For example, the movable contact piece 10 may be disposed above the first fixed terminal 6 and the second fixed terminal 7, and the fixed iron core 53 may be disposed below the movable iron core 52.

The mounting portions 22 and 23 are not necessarily configured to be mounted to the other member 60. That is, the second yoke 55 may be configured to be secured at least to the mounting portion 22 at the extending portion 57. Similarly, the second yoke 55 may be configured to be secured at least to the mounting portion 23 at the extending portion 58.

The extending portion 57 of the second yoke 55 and the mounting portion 22 of the case 2 may be bolted together. The extending portion 58 of the second yoke 55 and the mounting portion 23 of the case 2 may be bolted together.

Figure 2:
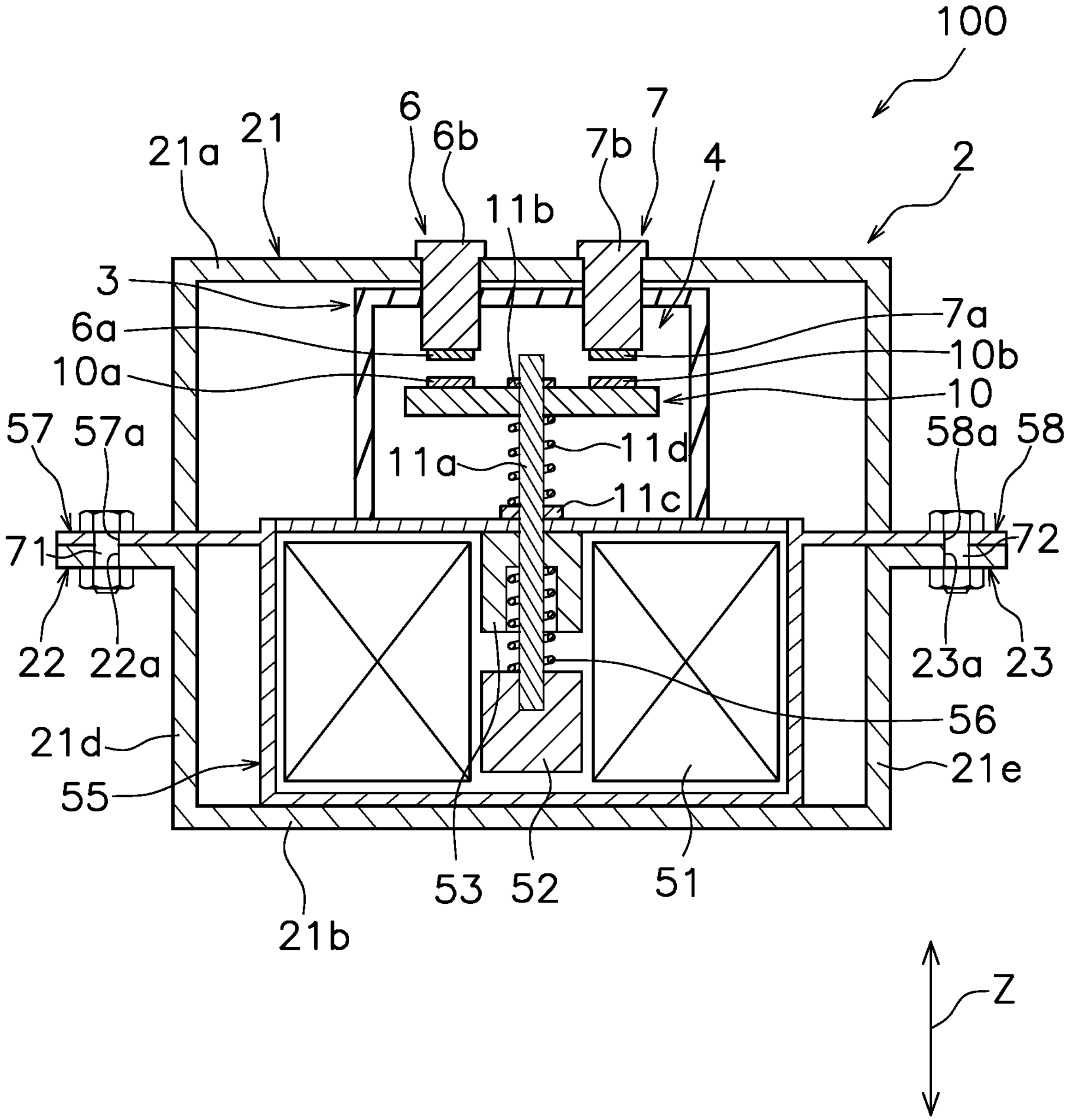
FIG. 2 is a schematic cross-sectional view of an electromagnetic relay in accordance with the claimed invention according to a modification.

The configurations of the first yoke 54 and the second yoke 55 may be changed. For example, the first yoke 54 may include the extending portions 57 and 58. Also, the positions of the first yoke 54 and the second yoke 55 may be interchanged. As shown in FIG. 2, the second yoke 55 may have a U-shape. As shown in FIG. 2, the extending portions 57 and 58 may extend to outside of the case 2 from the middle of the case 2 in the up-down direction.

Figure 3:
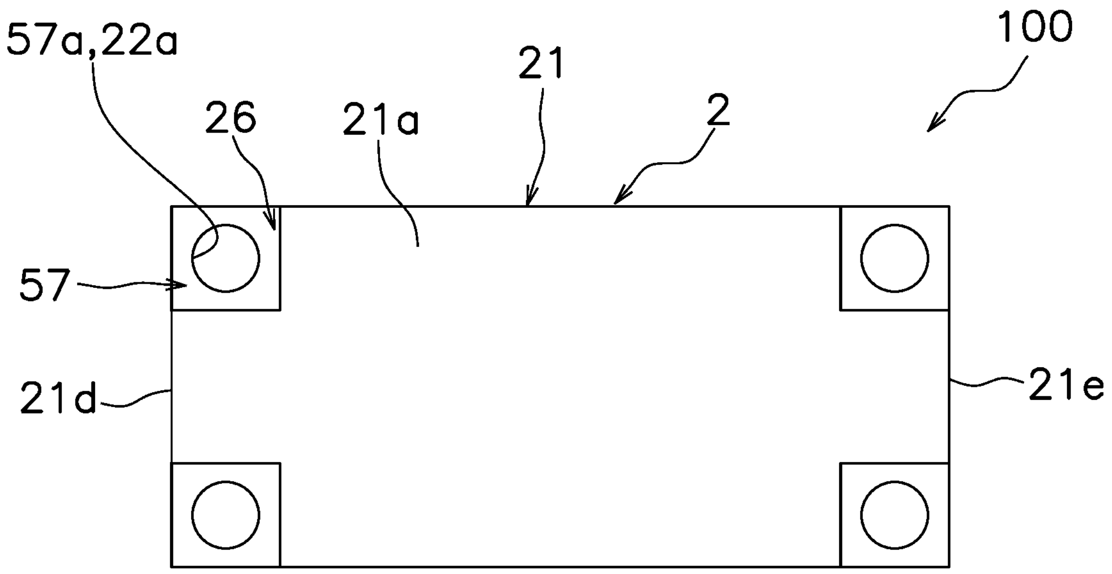
FIG. 3 is a schematic plan view of an electromagnetic relay in accordance with the claimed invention according to a modification.

The configuration of the case 2 may be changed. The case 2 does not have to accommodate the contact case 3. FIG. 3 is a top view of an electromagnetic relay according to a modification. As shown in FIG. 3, the case 2 of the electromagnetic relay according to the modification has recesses 26 recessed in the direction from the contact device 4 toward the electromagnet device 5. The recesses 26 are shaped to be recessed from the top wall 21*a* of the case body 21 toward the bottom wall 21*b*. The recesses 26 are exposed to outside of the case 2. The extending portion 57 is disposed at the bottom of the recesses 26. The mounting portion 22 is formed at the bottom of the recesses 26. In the embodiment shown in FIG. 3, the recesses 26 are disposed at the four corners of the case 2 and the extending portion 57 is provided for each of the recesses 26. The number of recesses 26 may be two.

REFERENCE NUMERALS

2 Case
22 Mounting portion
22*a* First screw-receiving hole
26 Recess
3 Contact case
4 Contact device
5 Electromagnetic device
55 Second yoke (Example of yoke)
57 Extending portion
57*a* Second screw-receiving hole
6*a* First fixed contact (Example of fixed contact)
10 Movable contact piece
10*a* First movable contact (Example of movable contact)
100 Electromagnetic relay
Z First direction

The invention claimed is:

1. An electromagnetic relay, comprising:

a case having a top wall, a bottom wall, and side walls disposed between and connected to the top and bottom walls, the bottom wall extending beyond the side walls;

a contact case housed in the case;

a contact device housed in the contact case, the contact device including a fixed contact and a movable contact piece including a movable contact; and an electromagnet device including a yoke, the yoke being disposed at the bottom of the electromagnet device and above the bottom wall, the electromagnet device housed in the case, the electromagnet device configured to drive the contact device, wherein the yoke includes an extending portion extending to outside of the case and is secured to the case at the extending portion.

2. The electromagnetic relay according to claim 1, wherein the extending portion is attached to the case via screws.

3. The electromagnetic relay according to claim 1, wherein the case includes a mounting portion disposed outside the side walls, the mounting portion has a first screw-receiving hole passing the mounting portion in a first direction, and the extending portion has a second screw-receiving hole overlapping the first screw-receiving hole when viewed from the first direction, the extending portion being secured to the mounting portion.

4. The electromagnetic relay according to claim 3, wherein the extending portion is configured to be screwed to another member together with the mounting portion.

5. The electromagnetic relay according to claim 1, wherein the case is comprised of an insulating material.

6. The electromagnetic relay according to claim 1, wherein the bottom wall has a mounting portion disposed outside the side walls, and the yoke is secured to the case at the mounting portion.

* * * * *